(12) United States Patent
Südow

(10) Patent No.: US 9,568,493 B2
(45) Date of Patent: Feb. 14, 2017

(54) IN SITU ACCELEROMETER CALIBRATION

(71) Applicant: PGS Geophysical AS, Oslo (NO)

(72) Inventor: Gustav Goran Mattias Südow, Houston, TX (US)

(73) Assignee: PGS Geophysical AS, Oslo (NO)

(*) Notice: Subject to any disclaimer, the term of this patent is extended or adjusted under 35 U.S.C. 154(b) by 177 days.

(21) Appl. No.: 14/292,104

(22) Filed: May 30, 2014

(65) Prior Publication Data
US 2015/0016216 A1    Jan. 15, 2015

Related U.S. Application Data

(60) Provisional application No. 61/844,650, filed on Jul. 10, 2013.

(51) Int. Cl.
*G01V 1/38* (2006.01)
*G01P 21/00* (2006.01)
*G01V 1/18* (2006.01)

(52) U.S. Cl.
CPC ............ *G01P 21/00* (2013.01); *G01V 1/3817* (2013.01); *G01V 1/18* (2013.01); *G01V 2200/14* (2013.01); *G01V 2210/1423* (2013.01)

(58) Field of Classification Search
CPC .......... G01S 1/3817; G01P 21/00; G01V 1/18
See application file for complete search history.

(56) References Cited

U.S. PATENT DOCUMENTS

| 6,932,017 | B1 | 8/2005 | Hillesund et al. |
| 7,379,386 | B2 | 5/2008 | Muyzert et al. |
| 7,684,281 | B2 | 3/2010 | Vaage et al. |
| 8,136,383 | B2 | 3/2012 | Goujon et al. |
| 8,139,439 | B2 | 3/2012 | Kamata |
| 8,528,381 | B2 | 9/2013 | Rodney et al. |
| 8,553,490 | B2 | 10/2013 | Hillesund et al. |
| 2005/0018537 | A1 | 1/2005 | Welker et al. |
| 2006/0231006 | A1* | 10/2006 | Hillesund ............... B63B 21/66 114/242 |
| 2008/0253225 | A1 | 10/2008 | Welker et al. |
| 2009/0056411 | A1 | 3/2009 | Goujon et al. |
| 2010/0202249 | A1 | 8/2010 | Goujon et al. |
| 2010/0202251 | A1* | 8/2010 | Ozdemir ................. G01V 1/36 367/24 |
| 2011/0211423 | A1 | 9/2011 | Muyzert et al. |
| 2012/0002504 | A1 | 1/2012 | Muyzert et al. |
| 2013/0064038 | A1 | 3/2013 | Maples et al. |

OTHER PUBLICATIONS

International Search Report and Written Opinion of Application PCT/EP14/064770 dated May 18, 2015.
PCT Partial International Search Report mailed on Feb. 12, 2015, in the prosecution of patent application PCT/EP2014/064770, 5 pages.
Frederic Camps et al., Numerical Calibration for 3-Axis Accelerometers and Magnetometers, IEEE, 2009, pp. 217-221.

* cited by examiner

*Primary Examiner* — Luke Ratcliffe
*Assistant Examiner* — Hovhannes Baghdasaryan

(57) ABSTRACT

Disclosed are methods and systems for calibration of an accelerometer used in a geophysical sensor while deployed in the water. An embodiment may include towing a streamer behind a survey vessel in a body of water, wherein the streamer comprises an accelerometer; causing at least a portion of the streamer to twist; receiving data from the accelerometer at a selected plurality of times during the twist; and based at least in part on the data, determining at least one calibration parameter of the accelerometer.

22 Claims, 6 Drawing Sheets

IN SITU ACCELEROMETER CALIBRATION

CROSS-REFERENCE TO RELATED APPLICATIONS

The present application claims priority to U.S. Provisional Application No. 61/844,650, filed Jul. 10, 2013, the entire disclosure of which is incorporated herein by reference.

BACKGROUND

Embodiments relate generally to marine geophysical surveying and, more particularly, embodiments relate to calibration of an accelerometer while deployed in the water.

Techniques for geophysical surveying include marine geophysical surveying, such as seismic surveying and electromagnetic surveying, in which geophysical data may be collected from below the Earth's surface. Geophysical surveying has applications in mineral and energy exploration and production to help identify locations of hydrocarbon-bearing formations. Certain types of marine geophysical surveying, such as seismic or electromagnetic surveying, may include towing an energy source at a selected depth—typically above the seafloor—in a body of water. One or more streamers also may be towed in the water at selected depths—typically above the seafloor—by the same or a different vessel. The streamers are typically cables that include a plurality of geophysical sensors disposed thereon at spaced apart locations along the length of the cable. Some geophysical surveys locate sensors on ocean bottom cables or nodes in addition to, or instead of, streamers. The geophysical sensors may be configured to generate a signal that is related to a parameter being measured by the geophysical sensor. At selected times, the energy source may be actuated to generate, for example, seismic or electromagnetic energy that travels downwardly into the subsurface rock. Energy that interacts with interfaces, generally at the boundaries between layers of rock formations, may be returned toward the surface and detected by the geophysical sensors on the streamers. The detected energy may he used to infer certain properties of the subsurface rock, such as structure, mineral composition and fluid content, thereby providing information useful in the recovery of hydrocarbons.

The geophysical sensors employed on the streamers may be vector sensors. Vector sensors may also be deployed on the streamer as rotation sensors to determine streamer location, velocity, or orientation. Examples of suitable vector sensors include those that comprise accelerometers. In some instances, the accelerometers may be multi-axis accelerometers. In some instances, the accelerometers may utilize a microelectromechanical (MEMS) based structure. Accelerometers may typically output a DC-coupled signal proportional to the acceleration applied to the device. However, usage of accelerometers may be problematic as the accelerometers may experience a DC bias and gain drift, which can negatively impact sensor performance. In some accelerometers, axial misalignment may also be a concern. Improved accelerometers that do not exhibit these drawbacks may be cost prohibitive. Thus, there is a need for improved calibration methods able to compensate for the non-idealities of the accelerometers.

BRIEF DESCRIPTION OF THE DRAWINGS

These drawings illustrate certain aspects of some of the embodiments of the present invention and should not be used to limit or define the invention.

DETAILED DESCRIPTION

It is to be understood the present disclosure is not limited to particular devices or methods, which may, of course, vary. It is also to be understood that the terminology used herein is for the purpose of describing particular embodiments only, and is not intended to be limiting. Although individual embodiments are discussed, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof; mean "including, but not limited to." The term "coupled" means directly or indirectly connected.

Embodiments relate to calibration of an accelerometer while deployed in the water. In particular, the calibration of the accelerometer may be performed based on mechanically twisting the streamer. Calibration parameters (e.g., gain and bias) extracted from data gathered during twisting of the streamers may be used for the accelerometer calibration. Advantageously, the calibration techniques may be employed while the streamer is deployed and may also be relatively fast in execution (e.g., about 1 minute or less). In addition to extraction of the gain and bias, embodiments may also extract the misalignment due to one or more of the axes of accelerometer not being perfectly orthogonal. By taking into account misalignment, error due to lack of orthogonality may be reduced. Moreover, information about streamer twist may also be extracted which can add significant value to the calibration method.

Figure 1:
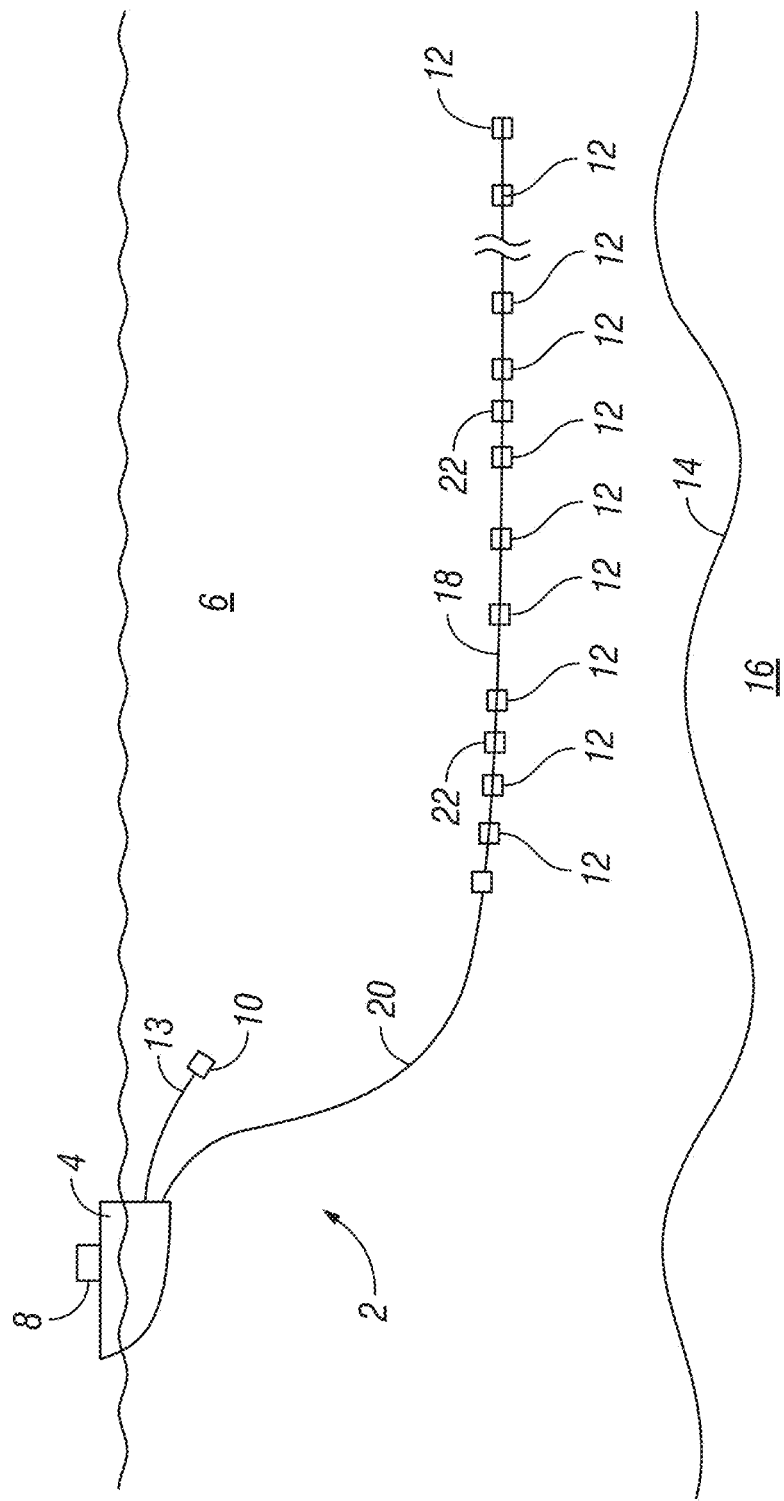
FIG. 1 shows an example embodiment of a marine geophysical survey system.

Referring now to FIG. 1, a marine geophysical survey system 2 is illustrated in accordance with example embodiments. As illustrated, the marine geophysical survey system 2 may include a survey vessel 4 moving along the surface of a body of water 6, such as a lake or ocean. The survey vessel 4 may include thereon equipment, shown generally at 8 and referred to for convenience as a "recording system." The recording system 8 typically may include devices (none shown separately) for navigating the survey vessel 4 (such as global positioning system ("GPS") receivers), for actuating at least one energy source 10, and/or for recording signals generated by sensors 12.

The marine geophysical survey system 2 may further include at least one energy source 10. As illustrated, the survey vessel 4 or a different vessel (not shown) may tow a source cable 13 that includes the energy source 10 through the body of water 6. In the illustrated embodiment, the energy source 10 is towed below the surface of the body of water 6. As illustrated, the energy source 10 may be below the surface of the body of water 6 and above the water bottom 14, wherein the energy source 10 may be disconnected from the water bottom 14. The energy source 10 may be any selectively actuable source suitable for marine geophysical surveying, including without limitation a seismic air gun, a water gun, a marine vibrator, an electromagnetic field transmitter, or an array of such devices. In some embodiments, seismic energy and/or electromagnetic energy may originate from the energy source 10. The energy source 10 may be towed in any suitable pattern for geophysical surveying, including in a parallel or orthogonal pattern, or possibly a circular or spiral pattern. At selected times, the energy source 10 may be triggered to generate energy that travels downwardly through the body of water 6 and rock formations 16 below the water bottom 14. It should be noted that, while the present example shows only a single energy source 10, the invention is applicable to any number of energy sources towed by the survey vessel 4 or any other vessel.

The marine geophysical survey system 2 may further include one or more streamers 18 towed by the survey vessel 4 (or another vessel) with the streamer 18 having thereon at longitudinally spaced apart positions a plurality of sensors 12. In the illustrated embodiment, the streamer 18 is shown being towed by the survey vessel 4 moving on the surface of the body of water 6. The streamer 18 may be coupled at its forward end (with respect to direction of movement of the survey vessel 4) to a corresponding lead-in line 20. While not shown, the lead-in line 20 may be deployed from the survey vessel 4 by a winch or other similar spooling device, for example, that can be used to control the deployed length of the lead-in line 20. In alternative embodiments, the streamer 18 may alternatively be deployed on or near the water bottom 14 or towed by another vessel (not shown). As another alternative, one or more additional streamers (not shown) may be towed behind the survey vessel 4, towed behind another vessel (not shown), or deployed at or near the water bottom 14. It should be noted that, while the present example, shows only a single streamer 18, the invention is applicable to any number of streamers 18 towed by the survey vessel 4 or any other vessel. For example, in some embodiments, eight or more streamers 18 may be towed by the survey vessel 4, while in other embodiments, as many as twenty-six or more streamers 18 may be towed by the survey vessel 4. Where multiple streamers 18 are deployed, the streamers 18 may be spaced apart laterally, vertically, or both laterally and vertically. "Lateral" or "laterally," in the present context, means transverse to the direction of the motion of the survey vessel 4.

The sensors 12 may be any type of sensor known in the art. In some embodiments, at least a portion of the sensors 12 may be geophysical sensors. Non-limiting examples of such geophysical sensors may include seismic sensors such as geophones, hydrophones, or accelerometers, or electromagnetic field sensors, such as electrodes or magnetometers. In some embodiments, the geophysical sensors may be vector sensors such as accelerometers and/or magnetometers. By way of example, at least a portion of the sensors 12 may generate response signals, such as electrical or optical signals, in response to detecting energy emitted from the energy source 10 after the energy has interacted with the rock formations 16 below the water bottom 14. Signals generated by the sensors 12 may be communicated to the recording system 8. In addition to geophysical sensors, at least a portion of the sensors 12 may also be vector sensors that can provide an output that is representative of, or can be processed to determine, streamer location, velocity, or orientation. Examples of suitable vector sensors may include 2- or 3-axis vector sensors, such as multi-axis accelerometers and multi-axis magnetometers. The type(s) and configurations(s) of the sensors 12 are not intended to limit the scope of the invention.

In accordance with an embodiment of the invention, a geophysical data product may be produced. The geophysical data product may include geophysical data obtained from one or more of the sensors 12 and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis, including further data processing, may be performed on the geophysical data product.

The streamer 18 may further include streamer rotation devices 22. As illustrated, the streamer rotation devices 22 may be disposed on the streamer 18 at spaced apart locations. In some embodiments, the streamer rotation devices 22 may have a spacing of about 200 meters to about 400 meters. Each streamer rotation device 22 may provide rotational torque to cause its rotation, and likewise rotation of the portion of the streamer 18 adjacent to the streamer rotation device 22. The streamer rotation devices 22 may also be used, for example, in the regulation of the streamer depth and streamer lateral positioning. In some embodiments, existing lateral force and depth (LFD) control devices may be used as streamer rotational devices 22. The LFD control devices may be any of a variety of different devices suitable for changing streamer location, velocity, or orientation and/or position, including "birds" having rotatable wings. In one example, the streamer rotation devices 22 may include rotatable wings mounted to a body disposed in-line with the streamer 18.

Figure 2:
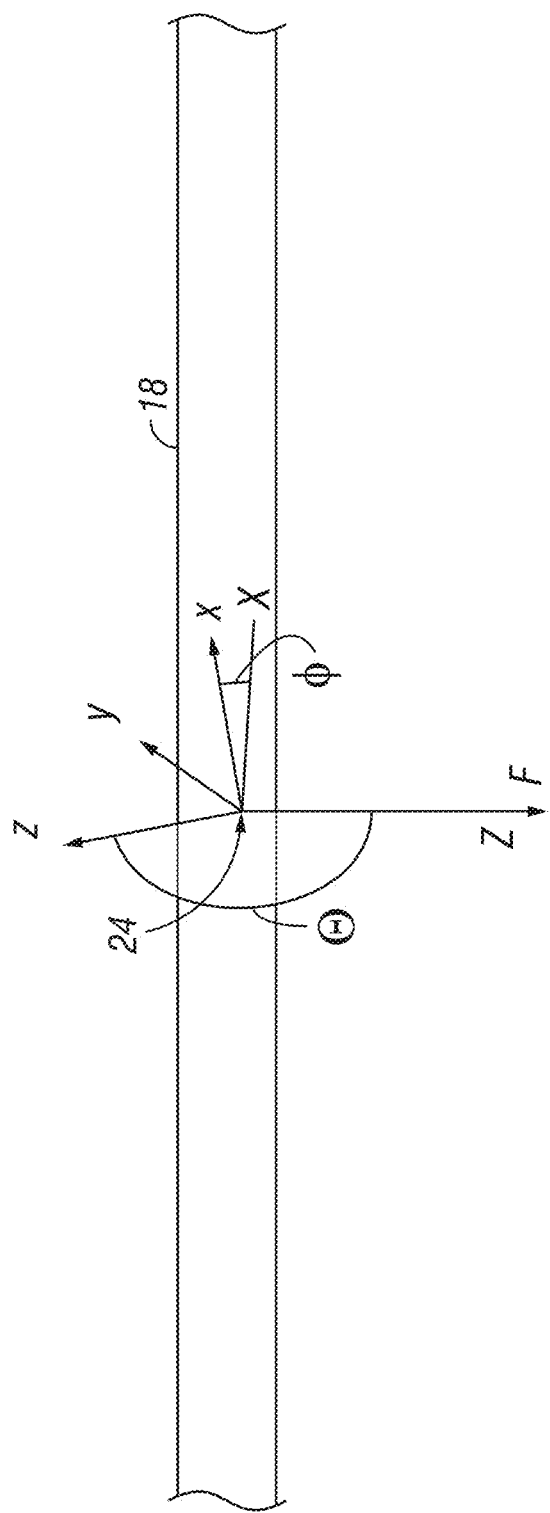
FIG. 2 shows an example embodiment of an accelerometer mounted in a streamer with local rotation.

FIG. 2 illustrates an accelerometer 24 mounted in a streamer 18 in accordance with example embodiment. As previously described, the accelerometer 24 may be incorporated into sensor 12 (see FIG. 1). In the illustrated embodiment, the accelerometer 24 is represented by its local coordinate system (x, y, z). As illustrated, external force may act on the accelerometer 24 resulting in rotation at the accelerometer 24. In particular embodiment, the external force may be the result of mechanically twisting the streamer 18. While not shown in FIG. 2, the streamer rotation devices 22 may be used to provide rotational torque and cause streamer twist. As illustrated, $\theta$ is the roll angle of the accelerometer 24 between the local z axis and the global Z axis and $\phi$ is the yaw angle of the accelerometer 24 between the local x axis and the global X axis.

The accelerometer 24 may be a multi-axis accelerometer. The accelerometer 24 may be used to detect acceleration in one, two, or three orthogonal axes. In some embodiments, the accelerometer 24 may be formed by multiple single-axis sensors. By way of example, the accelerometer 24 may be configured to detect acceleration along the local y and z axes. A suitable accelerometer 24 may have analog or digital output. In some embodiments, the output of the accelerometer 24 may be subsequently digitized. In particular embodiments, the accelerometer 24 may be a DC-response accelerometer that outputs a DC-coupled signal.

In accordance with present embodiments, calibration of the accelerometer 24 may be performed based on mechanically twisting the streamer 18. In other words, the streamer 18 may be intentionally twisted along a selected length for the calibration. Signals may be measured by the accelerometer 24 while the streamer 18 is twisted. Calibration parameters may then be extracted based on the measured signals. The calibration parameters may include gain, bias, and misalignment. The gain may also be referred to as the "scaling factor." The bias may also be referred to as the "offset." The calibration parameters may then be used to compensate for fabrication or other errors in the accelerometer 24 to achieve a more accurate output from the accelerometer.

For an example accelerometer 24 detecting acceleration along the $y_2$ and $z_2$ axes, the accelerometer 24 output in its local coordinate system may be:

$$Z = b_z + F a_z \cos(\theta + \epsilon_\theta)\cos\phi \quad \text{(Eq. 1)}$$

$$Y = b_y + F a_y \cos(\theta - \epsilon_\theta)\cos\phi \quad \text{(Eq. 2)}$$

wherein Z is the z-component of the accelerometer output at time, Y is the y-component of the accelerometer output, $b_z$ is the channel offset for the z-component, $b_y$ is the channel offset for the y-component, $a_z$ is the channel scale factor for the z-component, $a_y$ is the channel scale factor for the y-component, $\epsilon_\theta$ is the vector alignment error of the two off-streamer-axis channels, $\theta$ is the roll angle between the local z axis and the global Z axis, and $\phi$ is the yaw angle between the local x axis and the global X axis.

The roll angle $\theta$ may be determined by reordering the above equations and forming and forming their ratio as follows:

$$\frac{z - b_z}{F a_z} = \cos(\theta + \varepsilon_\theta)\cos\phi \quad \text{(Eq. 3)}$$

$$\frac{y - b_y}{F a_y} = \sin(\theta - \varepsilon_\theta)\cos\phi \quad \text{(Eq. 4)}$$

$$\frac{\frac{y - b_y}{F a_y}}{\frac{z - b_z}{F a_z}} = \frac{y - b_y}{a_y} \frac{a_z}{z - b_z} = X \quad \text{(Eq. 5)}$$

$$= \frac{\sin(\theta - \varepsilon_\theta)\cos\phi}{\cos(\theta + \varepsilon_\theta)\cos\phi}$$

$$= \frac{\sin\theta\cos\varepsilon_\theta - \cos\theta\sin\varepsilon_\theta}{\cos\theta\cos\varepsilon_\theta - \sin\theta\sin\varepsilon_\theta}$$

$$\Rightarrow X = \frac{\tan\theta - \tan\varepsilon_\theta}{1 - \tan\theta\tan\varepsilon_\theta} \quad \text{(Eq. 6)}$$

$$\Rightarrow \theta = \arctan\frac{X + \tan\varepsilon_\theta}{1 + X\tan\varepsilon_\theta} \quad \text{(Eq. 7)}$$

A number of different techniques may be used for extraction of the calibration parameters. In some embodiments, the calibration parameters may be estimated utilizing a two-dimensional projection of the measured signals on which an ellipse may be fitted. The ellipse may be skewed and offset. For a three-axis accelerometer, a three-dimensional projection may be made onto which an ellipsoid may be fitted. The calibration parameters may include gain, bias, and misalignment. To estimate the calibration parameters, a data set may be acquired to fit the ellipse (or ellipsoid) and thus estimate the calibration parameters. The data set may be acquired over time where the roll angle $\theta$ is varied. To achieve improved calibration and improved fit of the ellipse, data may be acquired at different roll angles $\theta$. The data set may include the x-, y-, and/or z-components of the sensor output. In some embodiments, the y- and z-components of the accelerometer 24 output may be projected on the y-z plane. In other embodiments, the x-, y-, and z-components of the accelerometer 24 output may be projected onto a three-dimensional coordinate system. An ellipse (or ellipsoid) may then be fitted onto the projected data using appropriate algorithms. Examples of suitable techniques for fitting the ellipse (or ellipsoid) may include, without limitation, an unbound least squares fit, a total least squares fit, and a non-linear optimization fit. Additional information on techniques for accelerometer calibration may be found in the following document: Frederick Camps et al., *Numerical Calibration for 3-Axis Accelerometers and Magnetometers*, Electro/Information Technology, pp. 217-221 (June 2009).

Figure 3:
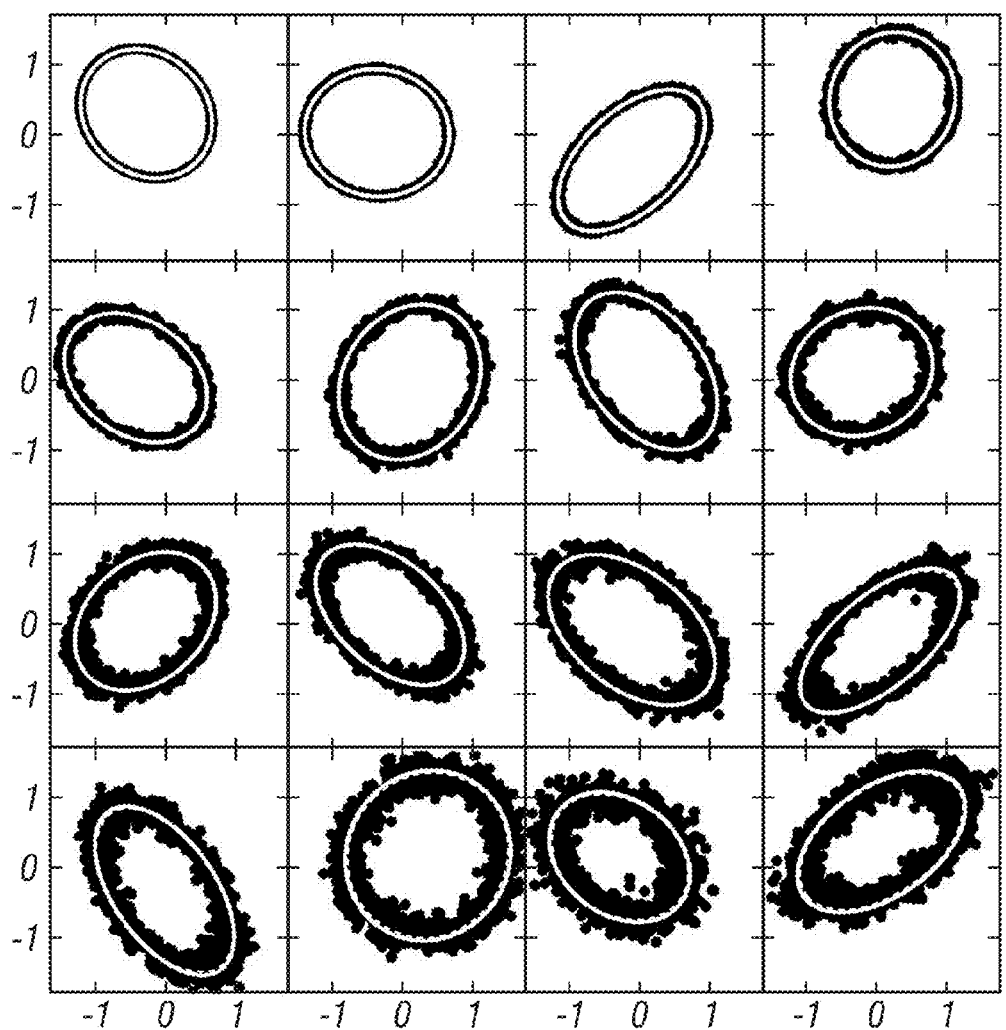
FIG. 3 shows an example embodiment of ellipses fitted to two-dimensional projections of simulated accelerometer data.

FIG. 3 shows an example embodiment of ellipses fitted to two-dimensional projections of simulated data for an accelerometer with added random noise (normally distributed amplitude and phase noise). In the illustrated embodiments, the noise increases sequentially from left to right and from top to bottom with the least noise in the upper left corner and the most noise in the lower right corner. The coordinates for the two-dimensional projections were the y- and z-components of the simulated data projected onto the y-z plane. The simulated data was at different hypothetical roll angles $\theta$ of the accelerometer 24. The simulated data contained 1001 data points evenly distributed over 0° to 360°. To fit the ellipse, an unbound least squares fit was performed. As illustrated, the fitted ellipses are skewed and offset. The bias, scale, and misalignment parameters may then be determined and used in calibration of the accelerometer 24.

In particular embodiments, misalignment errors may also be determined and used in example calibration methods. The misalignment errors may be displayed as rotation of the ellipse (or ellipsoid). Utilization of the misalignment errors in the calibration may be advantageous especially where non-orthogonality of the accelerometer 24 axes may be a significant error source. Even further, perfect orthogonality of the accelerometer 24 axes may not be required so long as the misalignment errors may be accounted for in the calibration. By way of example, the accelerometer 24 axes may have a misalignment of ±10° or less in some embodiments.

Figure 4:
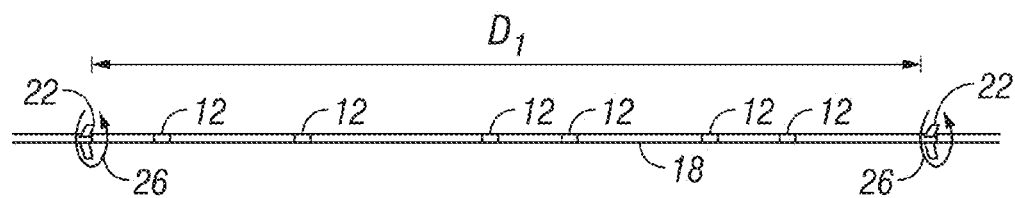
FIG. 4 shows an example portion of a streamer having geophysical sensors and streamer rotation devices.

FIG. 4 shows an example portion of a streamer 18 having sensors 12 and streamer rotation devices 22. One or more of the sensors 12 may incorporate an accelerometer 24 (see e.g., FIG. 2) that may be calibrated based on mechanically twisting the streamer 18. As illustrated, adjacent streamer rotation devices 22 may be spaced a distance $D_1$. In the illustrated embodiment, the streamer rotation devices 22 are spaced on the streamer 18 a distance $D_1$ of from about 100 meters to about 500 meters and, alternatively, about 200 meters to about 400 meters. In one particular embodiment, the streamer rotation devices 22 may be spaced a distance $D_1$ of about 300 meters. As further illustrated, the sensors 12 may also be distributed along the portion of the streamer 18.

To mechanically twist the streamer 18, rotational torque may be provided by one or more of the streamer rotation devices 22 to rotate the streamer 18 about its longitudinal axis. The twist may be considered a single axis twist as the streamer 18 generally may be rotated about its longitudinal axis to cause the twist. The rotational torque may cause rotation of the streamer rotation devices and likewise rotation of adjacent portions of the streamer 18. Rotation of the streamer rotation devices 22 is shown in FIG. 4 by arrows 26. Mechanical twist in the streamer 18 can occur, for example, where only portions of the streamer 18 are rotated, where portions of the streamer 18 are rotated at different rates, and/or where portions of the streamer 18 are rotated in opposite directions. For example, a portion (such as the portion shown in FIG. 4) may be twisted if only one of the streamer rotation devices 22 is rotated, the streamer rotation devices 22 are rotated at different rates, or the streamer rotated devices 22 are rotated in opposite directions. After the calibration is complete, the streamer 18 (or a segment thereof) may be untwisted. In some embodiments, the streamer 18 may be twisted as a twist moving down the entire length of the streamer 18 section by section. In alternative embodiments, the streamer 18 may be twisted at only specified streamer rotation devices 22, e.g., every second, every third, every fourth, or so forth, until the entire streamer 18 may be twisted and untwisted. Data may be collected from one or more sensors 12 in the twisted portion of the streamer 18. In some embodiments, the data may be collected at different twist rates (e.g., while the streamer 18 is being twisted) or after the streamer 18 has been twisted. The twist in the streamer 18 may be characterized by degrees of rotation per meter. By way of example, the streamer 18 or a section thereof (e.g., length of about 50 meters to about 200 meters) may mechanically twisted from about 1° to about 15° per meter and, alternatively, from about 3° to about 8° per meter. Accordingly, the data acquired for each sensor 12 (and thus each corresponding accelerometer 24) over the twisted streamer 18 may have a wide range of different roll angles θ and thereby input signals covering a wide range of acceleration (+/−1 $g_n$).

By mechanically twisting at least a portion of the streamer 18 (and thus collecting data from the sensors 12 over the twisted portion) instead of merely rotating the streamer 18, the relationship between the sensors 12 may be determined. By way of example, relative rotation of the sensors 12 may be determined. If rotating the streamer all at once, any twist in the streamer 18 exceeding the sampling theorem (e.g., twist of more than 360° per 2 sensors 12) may not be detected. By mechanically twisting the streamer 18, any twist in excess of the sampling theorem (e.g., up to one twist per sensor 12) can be detected as the relationship between adjacent sensors 12 may seem to move in the opposite direction of the applied twist.

In accordance to some embodiments, a controlled twist of the streamer 18 may be performed taking both roll rate and accelerometer 24 sampling rate into account so that a desirable set of data points may be acquired. One embodiment may use three complete rotations at a roll rate of 20°/second. In this embodiment, the accelerometer may have a sampling rate, for example of about 500 samples per second. The roll may be performed for one section of the streamer 18 and then propagated down successive sections of the streamer 18. The roll may be propagated down the streamer 18 to product twist by twisting at one streamer rotation device 22 while using adjacent streamer rotation devices 22 to hold the streamer 18 in position. In alternative embodiments, the roll rate may range from about 10°/second to about 90°/second.

Figure 5:
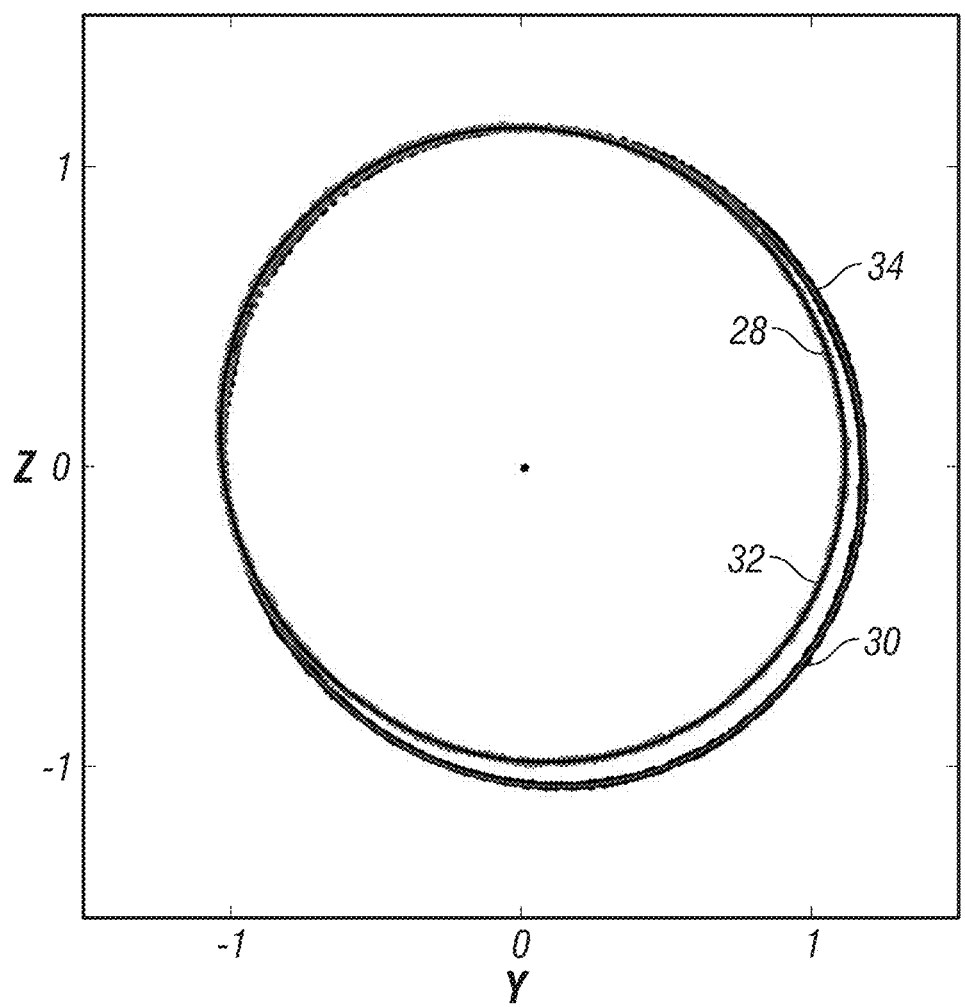
FIG. 5 shows an example embodiment of ellipses fitted to two-dimensional projections for measured data from a pair of multi-axis accelerometers.

FIG. 5 illustrates y-z trajectories for a pair of accelerometers 24 in a streamer section plotted together with their corresponding fitted ellipses 32, 34. The data was acquired over three complete rotations of the streamer 18 at a roll rate of 20°/second and an accelerometer 24 sampling rate of 500 samples per second. The coordinates for the two-dimensional projections were the y- and z-components of the data projected onto the y-z plane. The two-dimensional projections for the raw data of the two accelerometers 24 are represented by reference numbers 28 and 30, respectively. An unbound least squares fit was performed to fit an ellipse to the simulated data. The fitted ellipses for each of the accelerometers 24 are represented by reference numbers 32 and 34, respectively. Calibration parameters (or ellipse description parameters) may then be extracted from the fitted ellipses 32, 34.

Figure 6:
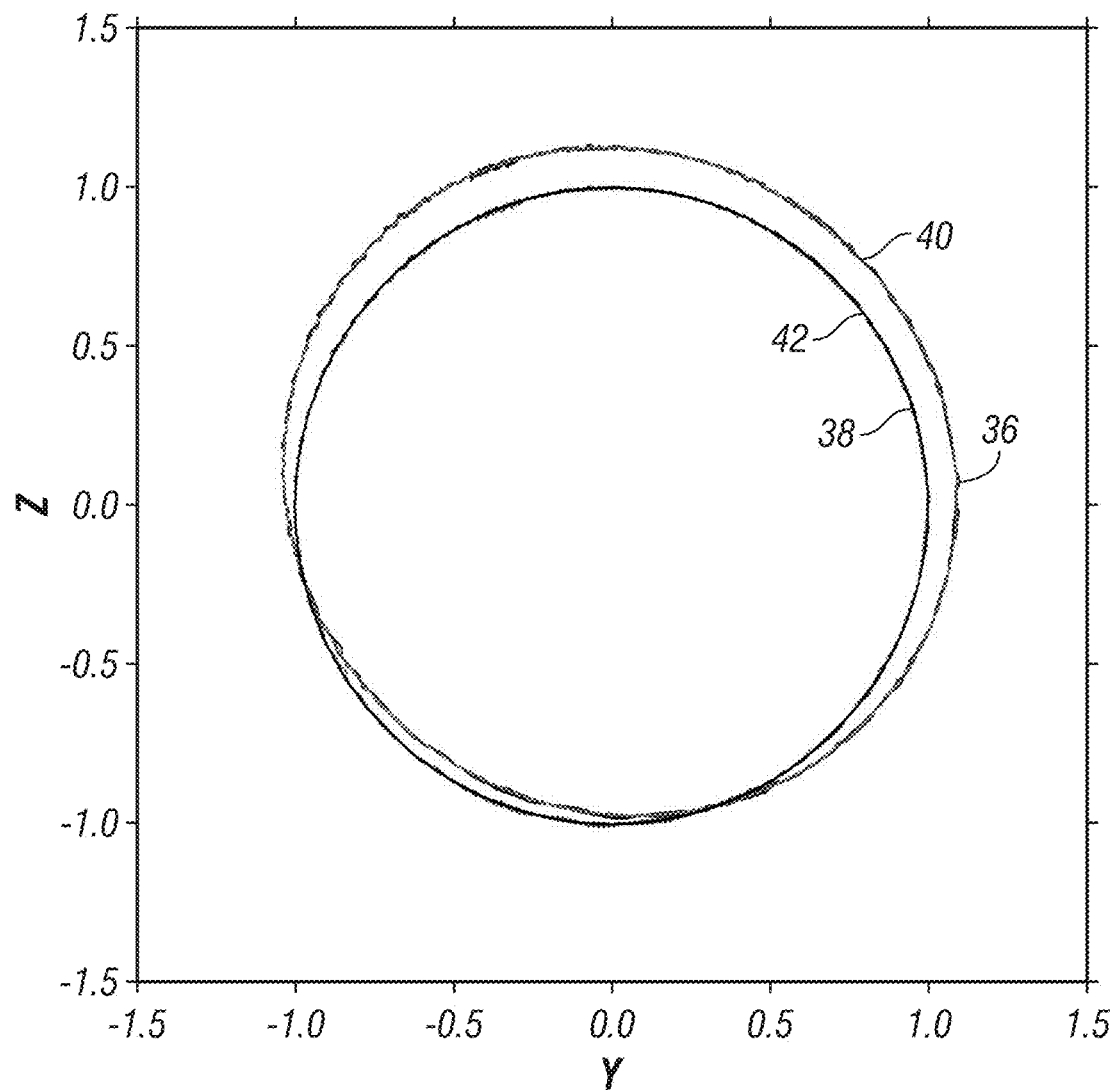
FIG. 6 shows an example embodiment of ellipses fitted to two-dimensional projections for simulated accelerometer data before and after calibration.

FIG. 6 illustrates y-z trajectories for an accelerometer 24 in a streamer section before and after calibration. The simulated data was acquired over three complete rotations of the streamer 18 at a roll rate of 20°/second and an accelerometer 24 sampling rate of 500 samples per second. The coordinates for the two-dimensional projections were the y- and z-components of the measured data projected onto the y-z plane. The two-dimensional projections for the raw data of the accelerometer 24 before calibration is represented by reference number 36 and after calibration is represented by reference number 38. An unbound least squares fit was performed to fit the ellipses to the simulated data. The fitted ellipses for the accelerometer 24 before and after calibration are represented by projected ellipse 40 and calibrated ellipse 42, respectively. Calibration parameters were extracted from the fitted ellipse 40 of the raw data prior to calibration and used in calibration of the accelerometer 24 moving the data from the projected ellipse 40 to the calibrated ellipse 42 centered in the projected ellipse 40.

Figure 7:
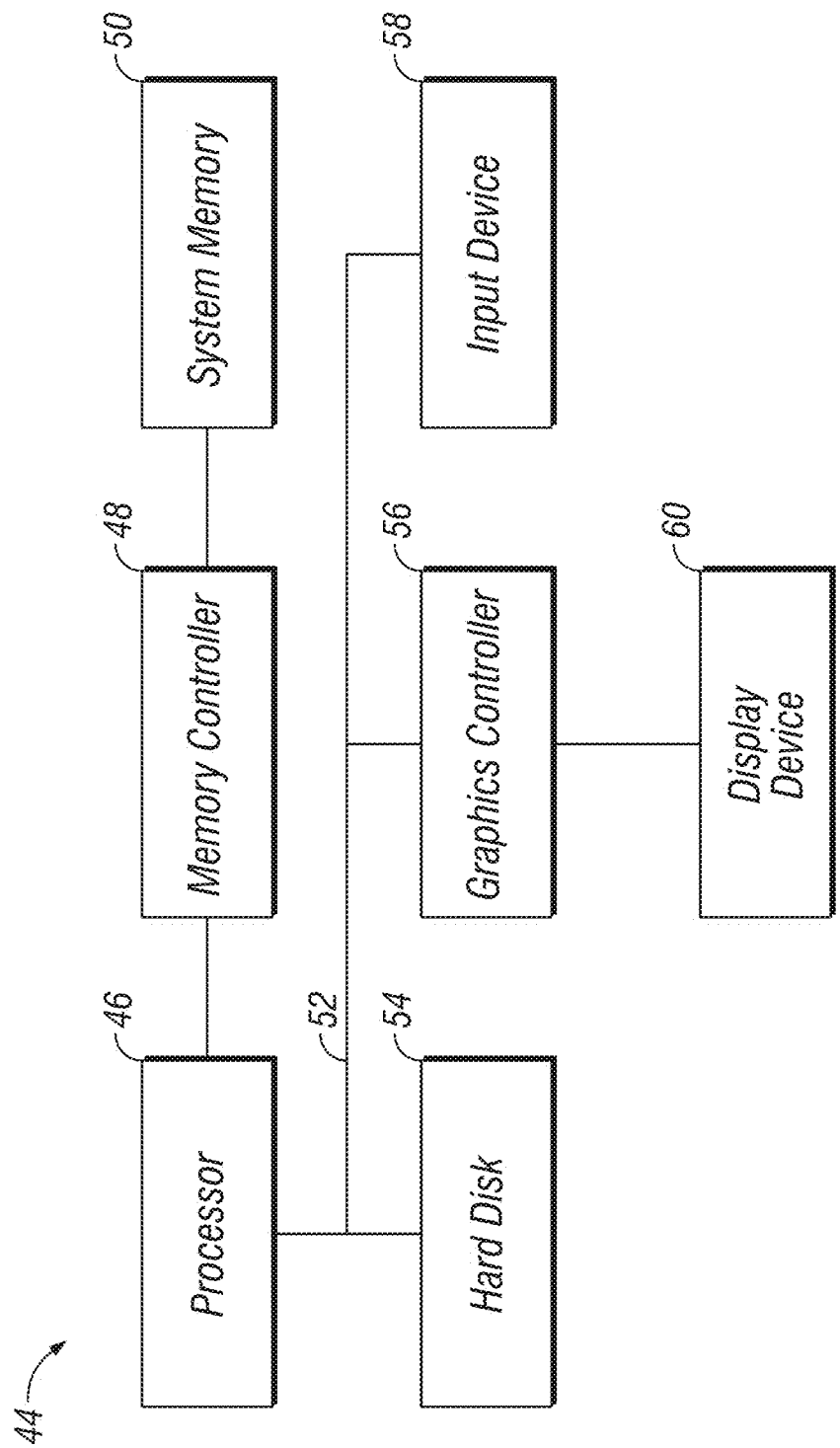
FIG. 7 shows an example of a computer system that may be used for implementing methods of the present invention.

FIG. 7 illustrates one embodiment of a computer system 44 that may be utilized in accordance with embodiments of the present invention. In some embodiments, the computer system 44 may be a component of the recording system (e.g., recording system 8 of FIG. 1). The computer system 44 may be used for implementing embodiments of the accelerometers calibration techniques described herein. By way of example, the computer system 44 may receive as inputs, without limitation, the sensed data from the accelerometers 24, roll data, and the like and output calibration information to the accelerometers 24. In some embodiments, the computer system 44 may receive and display the sensed signals, for example, from the accelerometers 24. Special or unique software for receiving the inputs, data processing, and sending output signals may be stored in the computer system 44 and/or on external computer readable media. Those of ordinary skill in the art will appreciate that the computer system 44 may comprise hardware elements including circuitry, software elements including computer code stored on a machine-readable medium or a combination of both hardware and software elements. Additionally, the blocks shown on FIG. 7 are but one example of blocks that may be implemented. A processor 46, such as a central processing unit or CPU, may control the overall operation of the computer system 44. The processor 46 may be connected to a memory controller 48, which may read data to and writes data from a system memory 50. The memory controller 48 may have memory that includes a non-volatile memory region and a volatile memory region. The system memory 50 may be composed of a plurality of memory modules, as will be appreciated by one of ordinary skill in the art. In addition, the system memory 50 may include non-volatile and volatile portions. A system basic input-output system (BIOS) may be stored in a non-volatile portion of the system memory 50. The system BIOS is adapted to control a start-up or boot process and to control the low-level operation of the computer system 44.

The processor 46 may be connected to at least one system bus 52 to allow communication between the processor 46 and other system devices. The system bus 52 may operate under a standard protocol such as a variation of the Peripheral Component Interconnect (PCI) bus or the like. In the example embodiment shown in FIG. 7, the system bus 52 may connect the processor 46 to a hard disk drive 54, a graphics controller 56 and at least one input device 58. The hard disk drive 54 may provide non-volatile storage to data that may be used by the computer 44. The graphics controller 56 may be in turn connected to a display device 60, which may provide an image to a user based on activities performed by the computer system 44. The memory devices of the computer system 44, including the system memory 50 and the hard disk 54 may be tangible, machine-readable media that store computer-readable instructions to cause the processor 46 to perform a method according to an embodiment of the present techniques.

If there is a conflict in the usages of a word or tem' in this specification and or more patent or other documents that may be incorporated herein by reference, the definitions that are consistent with this specification should be adopted for the purposes of understanding this invention.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method, comprising:
towing a streamer behind a survey vessel in a body of water, wherein the streamer comprises an accelerometer;
causing at a portion of the streamer to twist along a selected length such that the portion has a twist of about 1° to about 15° per meter;
receiving data from the accelerometer at a selected plurality of times during the twist; and
based, at least in part on the data, determining at least one calibration parameter of the accelerometer.

2. The method of claim 1, wherein the accelerometer comprises a multi-axis accelerometer.

3. The method of claim 1, wherein the portion of the steamer caused to twist has a length of about 100 meters or longer.

4. The method of claim 1, wherein the portion of the streamer has a twist of about 3° to about 8° per meter.

5. The method of claim 1, further comprising determining relative rotation of a first sensor on the streamer with respect to another sensor on the streamer, wherein the first sensor is the accelerometer.

6. The method of claim 5, further comprising:
obtaining geophysical data from the first sensor; and
producing a geophysical data product from the geophysical data.

7. The method of claim 6, further comprising importing the geophysical data product onshore.

8. The method of claim 1, further comprising projecting at least a portion of the data from the accelerometer onto a two- or three-dimensional coordinate system; and fitting a geometrical shape to the projection of the data.

9. The method of claim 1, wherein the calibration parameter comprises at least one parameter selected from the group consisting of gain, bias, and misalignment.

10. The method of claim 1, further comprising calibrating the accelerometer to account for accelerometer misalignment.

11. The method of claim 1, further comprising calibrating the accelerometer using at least the calibration parameter.

12. A method, comprising:
towing a streamer behind a survey vessel in a body of water, wherein the streamer comprises an accelerometer, wherein the accelerometer comprises a multi-axis accelerometer that lacks orthogonality of least one of its axes;
causing at least a portion of the streamer to twist;
receiving data from the accelerometer at a selected plurality of times during the twist; and
based, at least in part on the data, determining at least one calibration parameter of the accelerometer.

13. A method, comprising:
towing a streamer behind as survey vessel in a body of water, wherein the streamer comprises a multi-axis accelerometer;
rotating a streamer rotation device on the streamer without rotation of an adjacent streamer rotation device to cause a portion of the streamer between the streamer rotation device and the adjacent streamer rotation device to twist along a selected length such that the portion has a twist of about 1° to about 15° per meter;
receiving data from the multi-axis accelerometer at a selected plurality of times during the twist; and
based at least in part on the data, determining at least one calibration parameter of the accelerometer.

14. The method of claim 13, further comprising untwisting the portion of the streamer and causing another portion of the streamer to twist.

15. The method of claim 13, wherein the portion of the steamer caused to twist has a length of about 100 meters or longer, and has a twist of about 3° to about 8° per meter.

16. The method of claim 13, further comprising determining relative rotation of a first sensor on the streamer with respect to another sensor on the streamer, wherein the first sensor is the multi-axis accelerometer.

17. The method of claim 16, further comprising:
obtaining geophysical data from the first sensor; and
producing a geophysical data product from the geophysical data.

18. The method of claim 17, farther comprising importing the geophysical data product onshore.

19. The method of claim 13, further comprising projecting at least a portion of the data from the accelerometer onto a two- or three-dimensional coordinate system; and fitting a geometrical shape to the projection of the data.

20. The method of claim 13, wherein the calibration parameter comprises at least one parameter selected from the group consisting of gain, bias, and misalignment.

21. The method of claim 13, further comprising calibrating the accelerometer to account for accelerometer misalignment.

22. The method of claim 13, further comprising calibrating the accelerometer using at least the calibration parameter.

* * * * *

UNITED STATES PATENT AND TRADEMARK OFFICE
CERTIFICATE OF CORRECTION

PATENT NO. : 9,568,493 B2  Page 1 of 1
APPLICATION NO. : 14/292104
DATED : February 14, 2017
INVENTOR(S) : Gustav Goran Mattias Südow It is certified that error appears in the above-identified patent and that said Letters Patent is hereby corrected as shown below:

In the Claims

Column 10, Line 24, Claim 13:
towing a streamer behind "as" survey vessel
Should be changed to:
towing a streamer behind --a-- survey vessel Signed and Sealed this
Sixteenth Day of May, 2017

Michelle K. Lee
*Director of the United States Patent and Trademark Office*